United States Patent [19]

Benz

[11] Patent Number: 4,947,273

[45] Date of Patent: Aug. 7, 1990

[54] AUTOLOADING, INTERCHANGEABLE-MEDIA, DISK-DRIVE APPARATUS

[75] Inventor: Bernard D. Benz, Portola Valley, Calif.

[73] Assignee: Texor Corporation, San Francisco, Calif.

[21] Appl. No.: 274,385

[22] Filed: Nov. 21, 1988

[51] Int. Cl.⁵ ............................................. G11B 17/08
[52] U.S. Cl. ................................. 360/98.06; 360/98.01
[58] Field of Search ................... 360/98.06, 98.08, 15, 360/98.04, 98.05, 98.01, 92, 99.02, 99.06; 369/194, 191

[56] References Cited

U.S. PATENT DOCUMENTS

| | | | |
|---|---|---|---|
| 4,654,732 | 3/1987 | Mesher | 360/98.05 |
| 4,688,124 | 8/1987 | Scribner et al. | 360/99.02 |
| 4,693,659 | 9/1987 | Burke et al. | 360/98.04 X |
| 4,833,552 | 5/1989 | Agostini et al. | 360/98.06 X |

Primary Examiner—Robert S. Tupper
Assistant Examiner—Andrew L. Sniezek
Attorney, Agent, or Firm—Robert K. Stoddard

[57] ABSTRACT

The autoloading mechanism accepts diskettes stacked in an input tray and loads each into a slightly modified commercial disk drive for read-write operations. At the end of these operations, the diskette is either rejected or inserted into an output tray. The diskette transport mechanism uses a pair of belts, unidirectionally travelling along a simple loop-shaped path, to load an input diskette into the drive and insert an output diskette into the output tray while travelling a distance equal to half the belt length. The disk drive is easily removed for servicing or replacement.

25 Claims, 7 Drawing Sheets

AUTOLOADING, INTERCHANGEABLE-MEDIA, DISK-DRIVE APPARATUS

BACKGROUND OF THE INVENTION

The present invention relates generally to the field of rotating memory devices used for mass storage of data, more particularly to disk drives for use with interchangeable disk media, and especially to an autoloading disk drive capable of accepting an input stack of such interchangeable disk media and sequentially selecting each of the disks in the input stack for either reading the data therefrom or writing new data thereon. It will be understood that such interchangeable disk media comprise not only the familiar floppy diskettes using magnetic recording of data on a circular-disk media rotating within an outer envelope, but may also include any other form of removable, interchangeable planar storage media such as optically scanned media, media which are not rotated but rectilinearly scanned, or others as appropriate.

The use of such disk media in the form of floppy diskettes has become very widespread as a result of the growth of the small-computer industry in recent times. Diskettes are used for the storage of new data generated by the computer, as a convenient means for the distribution of computer software in commerce, and for backup of data present on other media such as fixed hard disks. Diskettes used for the distribution of software or for the backup of data are produced by simply copying data from a source onto one or more of the diskettes.

In order to avoid the tedious manual insertion and removal of each diskette which are required when using a conventional disk drive during such copying operations, an automatically loaded disk drive is desirable. Such a drive should ideally be able, under the control of a host computer, to accept input diskettes in the form of a stack, to sequentially select each one of the diskettes in the stack, to write to, and to read from the selected diskette, and to deposit the diskettes after such operations in one or more output stacks.

Such an autoloading disk drive should be inexpensive, compact, reliable and easy to maintain and repair. In particular, its handling of diskettes should result in rapid and reliable loading and unloading of the drive mechanism without jamming or damage to the diskettes. Ideally, the design of such a drive should permit as many as 250 or more input diskettes to be accommodated.

DESCRIPTION OF THE PRIOR ART

U.S. Pat. No. 4,510,542 was issued Apr. 9, 1985 to M. J. Aggeler, and covers an automatically loaded drive for floppy diskettes. The apparatus of this patent accepts a vertical input stack of diskettes, the plane of each diskette thus being horizontal. The bottom diskette of the input stack is separated from the remainder of the stack and is selected for transport to the disk drive. Thus, each of the diskettes is sequentially moved from the bottom of the input stack in a generally horizontal direction to the disk drive, and from there to one or more output stacks.

While the design of this patent has proven reasonably satisfactory, several shortcomings have become apparent in use. The weight of the entire input stack of diskettes rests upon the diskette being selected for transport to the drive, resulting in compression of the lower diskettes in the stack and relatively high frictional forces resisting movement of the bottom diskette.

As a result of diskette compression the thickness of the bottom diskette becomes a variable which depends upon the weight of the input stack above it. This fact, combined with the above-mentioned frictional forces, makes reliable separation of the bottom diskette from the remainder of the input stack increasingly difficult as the size of the input stack increases.

Another shortcoming of this earlier design is that the choice of a horizontal direction of movement between the input stack and the disk drive causes the drive to be laterally displaced from the input stack. This fact, coupled with the related fact that the drive is itself oriented in a horizontal plane to receive the incoming diskette, causes the entire apparatus to occupy an undesirably large amount of space in a horizontal plane, or to have too large a "footprint".

Finally, this earlier design places the disk drive in a location where it is inaccessible for repair or replacement. Since the disk drive used in such an apparatus is a common type which can be expected to need repair, cleaning and replacement during the life of the apparatus, the drive needs to be as accessible as possible to facilitate these operations and avoid excessive "down time" and service costs.

U.S. Pat. No. 4,644,427 was issued Feb. 17, 1987 to H. D. Ashby, and covers an automatically loaded disk drive apparatus for use with floppy diskettes. The input diskettes are loaded into an inclined rack assembly with one corner of each diskette uppermost, such that the weight of each diskette is supported on two sides (FIGS. 1 and 7 of this patent). Each diskette drops from the lowermost end of this rack assembly and falls into a disk drive which has been custom designed or extensively modified to permit side loading and opposite-side ejection (see col. 8, line 53 to col. 9, line 4 of this patent).

The apparatus of the Ashby patent is noticeably bulky and requires the use of a disk drive which is custom-manufactured or highly modified and which is therefore expensive. Ashby's disk drive is, moreover, inconveniently located within the interior of the apparatus, making servicing or replacement needlessly difficult and costly.

SUMMARY OF THE INVENTION

An object of the present invention is to provide an autoloading disk drive for sequentially accessing each of an input plurality of disks for purposes of reading or writing data thereon under the control of a host computer.

A further object of the present invention is to provide such an autoloading disk drive which is faster than ones heretofore available.

A further object of the present invention is to provide such an autoloading disk drive which is less costly than ones heretofore available.

A further object of the present invention is to provide such an autoloading disk drive which is simple in design and which can be manufactured with a minimum of high-precision parts.

A further object of the present invention is to provide such an autoloading disk drive having high reliability and freedom from malfunction.

A further object of the present invention is to provide such an autoloading disk drive in which the drive itself can be a readily available commercial unit requiring a minimum of modification to adapt it for use in the autoloading mechanism.

A further object of the present invention is to provide such an autoloading disk drive in which the drive itself can easily be removed from the autoloading mechanism for routine servicing and replacement.

To the above ends, an autoloading diskdrive according to the present invention utilizes an endless belt as a means to transport each disk from an input stack to the disk drive for read-write operations. After these operations, ejection from the drive is accomplished by permitting the diskette to fall from the drive by the force of gravity. An accepted diskette is guided into an output stack, while a rejected diskette is deflected into a reject stack by an interposer mechanism. In the event the diskette is directed to the output stack, the belt completes the insertion of the diskette therein. Belt motion is unidirectional along a path which comprises a short, vertically oriented, elongated loop between two pulleys.

One half of this loop forms the input side of the transport mechanism, and the path of the belt on this side is transverse to the axis of the input stack of diskettes and parallel to the plane of the diskettes themselves. The outside face of the belt is in close proximity with the end diskette of the input stack, and a first cog extending transversely across the outside belt surface engages the lower edge of this end diskette and transports it upwardly, separating it from the input stack.

Travelling with the belt, the diskette is propelled upwardly into the disk drive, which is positioned immediately above the top of the loop with its diskette-insertion slot facing downwardly, approximately in line with the input side of the belt. The belt comes to rest when the diskette is fully inserted into the drive, a motor engages the drive clamp mechanism, and read-write operations are carried out on the diskette. At the completion of these operations, the drive clamp mechanism is released and a solenoid is actuated to reposition the drive with its diskette slot in line with the output side of the transport mechanism, formed by the downwardly moving half of the belt loop.

The diskette falls from the drive under the influence of gravity, and is directed into a reject stack or an (accepted) output stack by a moveable selector interposer. Continuing motion of the belt transport mechanism causes the first cog to push an accepted diskette into proper final position in the output stack while a second identical cog on the belt is simultaneously transporting a subsequent diskette from the input stack into the drive.

BRIEF DESCRIPTION OF THE DRAWING

The above and other features, objects and advantages of the present invention together with the best mode known to the inventor thereof for carrying out his invention will become more apparent from reading the following description of a preferred embodiment of the invention while studying the associated drawing, the various figures of which represent.

DETAILED DESCRIPTION OF THE PRESENT INVENTION

Figure 1:
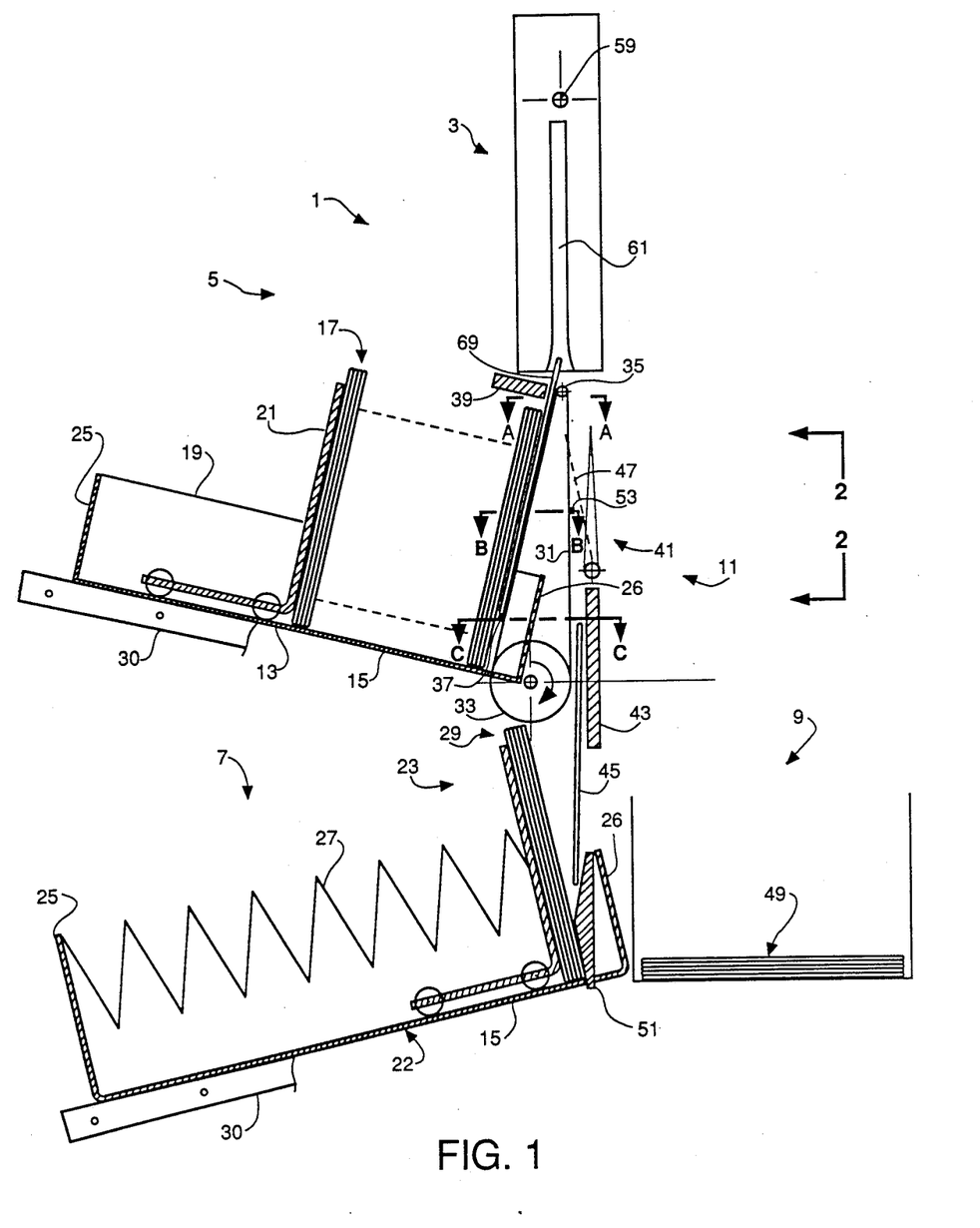
FIG. 1 is a side view, partially in elevation and partially in section, showing in somewhat schematic form an autoloading disk drive according to the present invention.

In FIG. 1 the essential elements of an autoloading disk drive mechanism 1 according to the present invention are shown somewhat schematically. These elements include a disk drive 3, a disk input 5, a disk output 7, a disk reject 9, and a disk transport mechanism 11.

Disk drive 3 may be any one of the many familiar interchangeable-media disk drives that are in use in desktop computers, such as a drive for 5.25 inch floppy diskettes, for example. The minor modifications needed to adapt such a drive for use in the autoloading mechanism 1 will be discussed later in this specification.

The disk input 5 incorporates an input tray 13 having a generally flat floor 15 for supporting an input stack 17 of as many as 250 diskettes. A pair of sides 19, only one of which is shown in FIG. 1, confine the vertically extending edges of stack 17 and form, together with floor 15, a generally U-shaped channel.

As shown in FIG. 1, input tray 13 is tilted such that floor 15 slopes in a direction to cause stack 17 to gravitate toward the right end of tray 13. A roller follower 21 is used to support the diskettes in an upright position and to exert additional force on the left end of stack 17 such that the input diskettes are continuously urged to the right in FIG. 1.

As will be obvious from a consideration of the equilibrium of forces on the diskettes of stack 17, the amount of force urging the stack to the right can be adjusted very easily merely by varying the tilt angle of input tray 13. In fact, if this angle is adjusted carefully, it is possible to cause the frictional force exerted by input tray 13 on each diskette to be approximately balanced or equalled by the component of gravitational force in a direction parallel to the axis of tray 13. When the tray 13 is thus oriented, each diskette can be caused to move toward the right end of tray 13 by the application of a slight additional force from follower 21. Under this condition, the tray is said to be tilted at the friction angle.

In practice, this angle is best found empirically by tilting tray 13 enough to overcome the retarding frictional force between floor 15 and the lower edges of the diskettes, producing reliable feeding of diskettes. With the proper selection of angle, even a large input stack 17 can be accommodated without undue pressure at the right end of the stack and without encountering any gaps or stuck diskettes as the stack feeds toward the right.

The disk output 7 is provided with an output tray 22 similar in design to input tray 13, the only exception being that a spring-loaded follower 23 is provided. Output tray 22 is tilted such that its left end is lower than its right. An end wall 25 terminates tray 22 and serves as an attachment point for the left end of a spring 27 which is compressed and drives follower 23 to the right. Follower 23 supports the diskettes of an output stack 29 in an upright position as stack 29 grows during operation of mechanism 1.

The equilibrium of forces on the diskettes of stack 29 is such that output tray 22 should theoretically be tilted at an angle slightly greater than the friction angle in order to provide that the pressure between diskettes is very low at the right end of stack 29, since the pressure exerted by spring 27 at the left end of stack 29 increases as the stack grows. As in the case of input stack 17, the optimum angle for reliable insertion of output diskettes and the maintenance of an orderly output stack 29 is best found empirically.

Figure 1A:
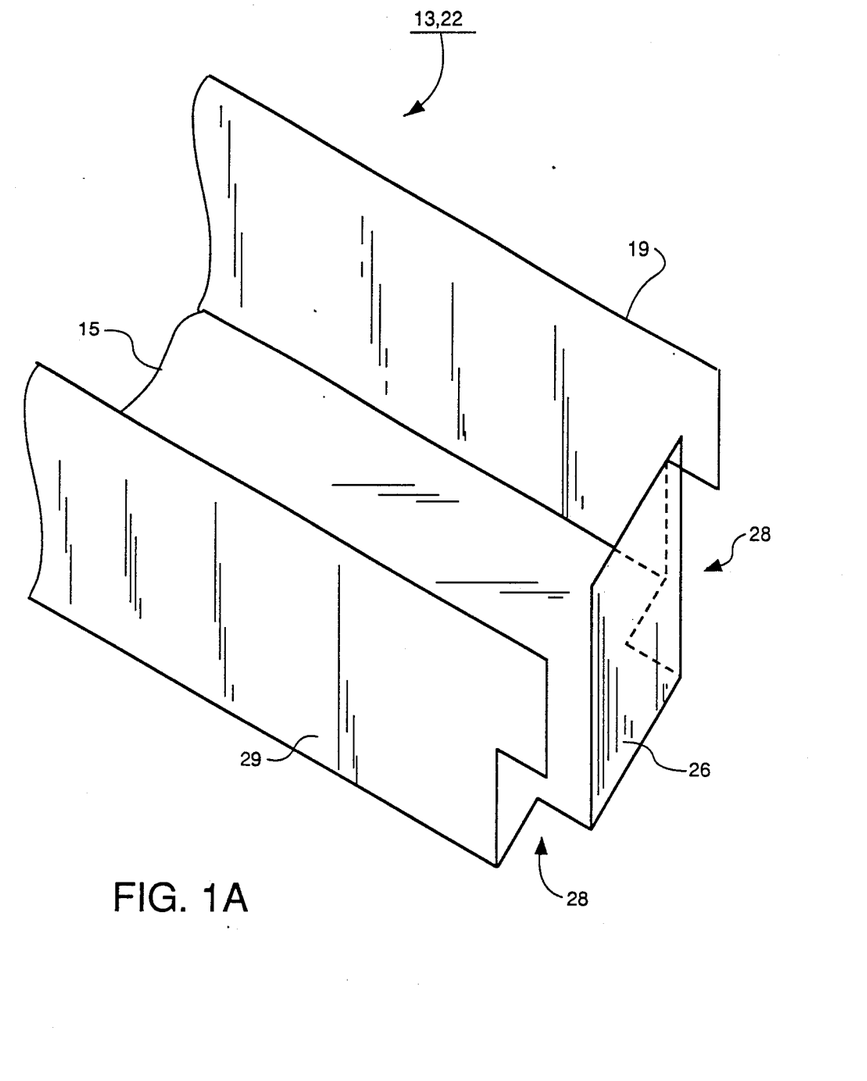
FIG. 1A is an isometric perspective view of a diskette tray according to the present invention.

In FIG. 1A, the structure of a removable, interchangeable tray 13, 22, which is usable for either an input tray or output tray according to the present invention is illustrated. Tray 13, 22 is readily formed of sheet metal such as aluminum, for example, by a series of conventional punching and folding operations. The floor 15 is bounded along its lateral edges by a pair of sides 19 which are spaced apart sufficiently to accommodate input stack 17 or output stack 29. Sides 19 might be spaced apart by 5.3 inches to accommodate a stack of standard 5.25 inch floppy diskettes, for example, such that they serve as an edge-guiding means for maintaining edge alignment of the stack of diskettes within tray 13, 22.

The rear end of tray 13, 22 is provided, as shown in FIG. 1, with an end wall 25 formed, as are sides 19, by folding up a projecting portion of floor 15. End wall 25 serves as a convenient stop to prevent accidentally discharging the contents of the tray during handling and loading (in the case of input tray 13) and, as noted above, as an attachment point for spring 27 (in the case of output tray 22).

Similarly, the front end of tray 13, 22 is provided with a loading stop 26 against which the stack of diskettes comes to rest when the tray is removed from the autoloading mechanism 1. Portions of floor 15 and sides 19 are cut away as shown in FIG. 1A to form recesses 28 for purposes which will be clarified in later portions of this description.

Input tray 13 is loaded into the autoloading mechanism 1 by being slid rightwardly along a pair of support rails 30, one of which is partially shown in FIG. 1, mounted on the support frame (not shown in FIG. 1). In a similar fashion, output tray 22 is slid rightwardly along support rails and retained in place by a releasable catch or detent (not shown). In each case, the corresponding support rails 30 are positioned at an angle to the horizontal selected as indicated above to provide for reliable feeding of the diskettes of input stack 17 and output stack 29. Rails 30 may be formed of square cross-section aluminum or of aluminum angle stock, as examples.

The use of removable, interchangeable input and output trays in the autoloading mechanism 1 permits the trays to be conveniently and easily loaded or unloaded while they are removed from the autoloader. In this way, a number of such trays can be loaded prior to operating the autoloader such that a fresh tray of input diskettes can be quickly substituted for one which is exhausted. Such trays can also be used as a convenient disk storage means, or as input trays for subsequent disk-processing operations such as labeling and packaging.

Transport mechanism 11 serves to transport input diskettes from input stack 17 to disk drive 3 for read-write operations, and for drive 3 into either output stack 29 or reject stack 9. Transport mechanism 11 includes a pair of transport belts 31, only one of which is illustrated in FIG. 1, extending in a simple, generally vertically aligned loop defined by a drive pulley 33 at the lower end and a small loading pulley 35 at the upper end. Preferably, each of belts 31 is an internally cogged timing belt, and drive pulley 33 is correspondingly externally cogged to permit exact positioning and synchronism of the belts.

A first cog 37 on the left side of belt 31 engages the lower edge of the endmost diskette in stack 17 and, as drive pulley 33 rotates in the direction of the arrow in FIG. 1, transports this diskette upwardly along an input axis which extends past a singulation gate 39 and toward disk drive 3. Gage 39 is dimensioned and positioned such that only a single diskette will undergo separation from stack 17 for transport to drive 3, hence the descriptor "singulation".

A detailed description of the insertion of a diskette into drive 3 will be presented later, however it may be noted here that loading pulley 35 is positioned such that a diskette is fully inserted into drive 3 when its lower edge is resting on belt 31 at the apex of the belt-loop. At this point, belt 31 is stopped and read-write operations on the diskette inserted in drive 3 begin. At the end of read-write operations on a diskette, it is permitted to drop from drive 3 along an output axis which extends past a selector interposer 41.

Interposer 41 in the position shown in FIG. 1 will cause a diskette dropping from drive 3 to fall past a guide plate 43 and into the position illustrated by output diskette 45, which is ready to be inserted into output tray 22. If interposer 41 is in the position indicated by the dotted line 47, a falling diskette will be deflected into disk reject 9, where it will land on a reject stack 49. Interposer 41 is operated between the two positions just indicated by a solenoid actuator (not shown) in FIG. 1, but indicated generally in FIG. 6 to be described later).

An accepted diskette such as 45 comes to rest with its lower edge caught in the nip between output stack 29 and a loading finger 51 on support frame 55. As belt 31 continues to move, a second cog 53 which is equispaced from first cog 37 along the surface of belt 31, engages the upper edge of output diskette 45 and completes the insertion of this diskette into output tray 22 at the same time as first cog 37 is completing the insertion of input diskette 69 into drive 3. As noted above, belt 31 is stopped at this point to permit read-write operations on diskette 69.

At the end of these operations, the diskette is allowed to drop from drive 3 as will become clearer from the descriptions of FIGS. 3A-3C below, and belt 31 is started again. As belt 31 starts to move, second cog 53 advances a short distance around drive pulley 33 to engage and load the next input diskette.

The foregoing description of the operation of mechanism 1 shows that belt 31 completes the insertion of one input diskette into drive 3 and one output diskette into output tray 22 or reject stack 49 each time belt 31 advances by a distance equal to only half its length. Further, the movement of belt 31 is unidirectional along a path which consists of a simple loop. The mechanical simplicity and economy of motion inherent in this disk transport mechanism are believed to result in greater speed and freedom from mechanical malfunction and disk jamming.

Figure 2:
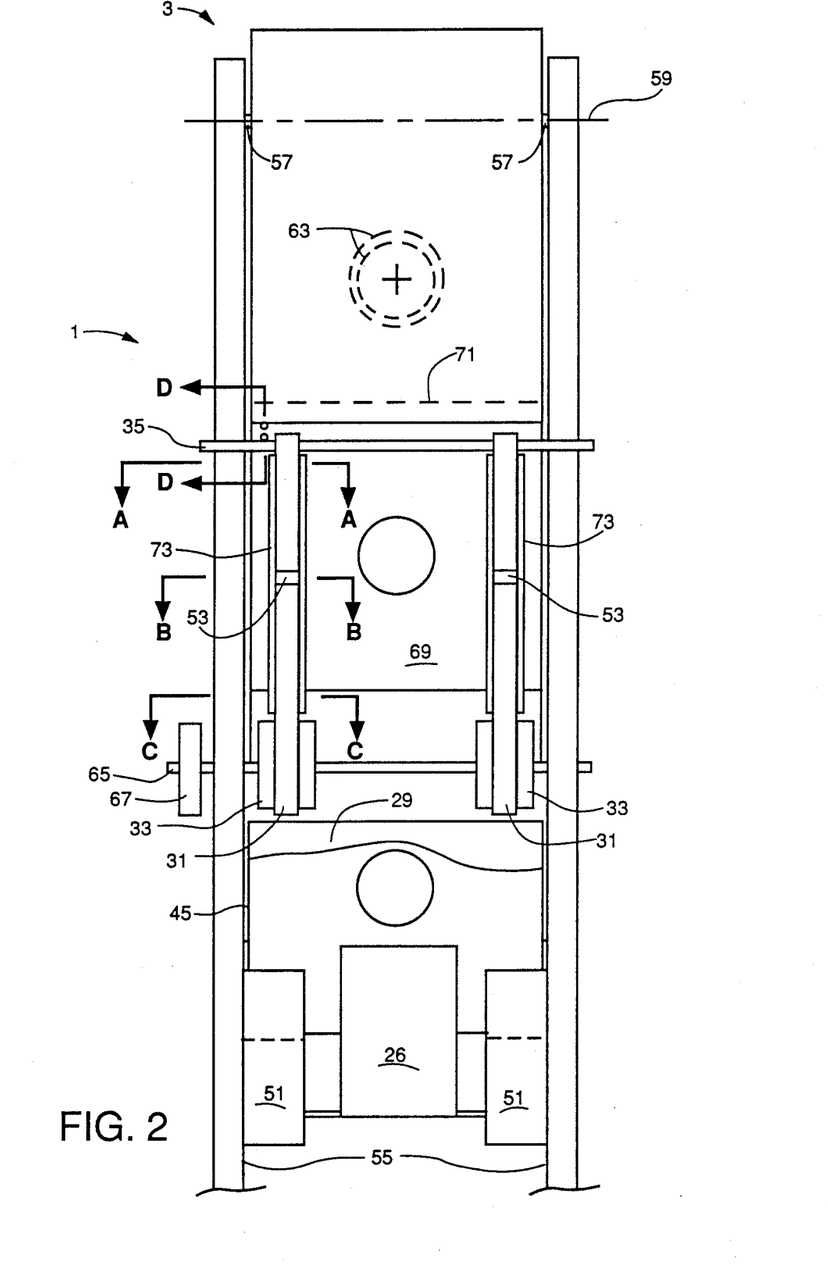
FIG. 2 is an end elevational view of the apparatus of FIG. 1 as viewed in the direction of the arrows 2—2 in FIG. 1.

Turning now to FIG. 2, the autoloading disk drive mechanism 1 is shown to include a pair of upright support frames 55 which may be made of, for example, 0.375 inch aluminum sheet stock. Disk drive 3 is suspended between frames 55 by a pair of trunnions 57 which together form a pivot axis 59 (shown also in FIG. 1) lying approximately in the plane of a diskette insertion slot 61 as indicated in FIG. 1. The location of the conical diskette hub-clamp mechanism within drive 3 is indicated by a pair of concentric circles 63.

As will be readily apparent from examination of FIGS. 1 and 2, the location of disk drive 3 in the upper region of autoloading mechanism 1 and the use of a single pair of supports for suspending drive 3 ensure that the drive can be easily removed for servicing or replacement when needed.

A drive shaft 65 extends between frames 55 and has a pair of drive pulleys 33 mounted thereon to drive each of belts 31 by means of a motor pulley 67 mounted on the left end of shaft 65. Motor pulley 67 may be cogged, and may be driven by a cogged timing belt (not shown) from a stepper motor which is not shown in FIG. 2 but which is illustrated schematically in FIG. 6, to be described later. An input diskette 69 (shown also in FIG. 1) is shown with its upper edge 71 (indicated by a dotted line) just entering slot 61 in drive 3.

Loading pulley 35 may be a single shaft of uniform diameter extending between frames 55 and rotatably supported by bearings (not shown) within frames 55. A pair of channelled belt guides 73 are mounted on frames 55 to support belts 31 as will become clearer from the description of FIGS. 2A–2C which follows. Although not shown in FIG. 2, it will be understood that a pair of first cogs 37 are positioned at the lower edge of diskette 69, propelling it upwardly as belts 31 are driven.

Simultaneously, a pair of second cogs 53 are descending. Belts 31 are substantially identical, each having first and second cogs 37 and 53 respectively positioned equispaced on the outside surface of the belt. Similarly, drive pulleys 33 are oriented on drive shaft 65, and belts 31 are positioned on pulleys 33 such that the pairs of cogs 37 and 53 are aligned in a direction transverse to the direction of movement of belts 31.

Figures 2A, 2B:
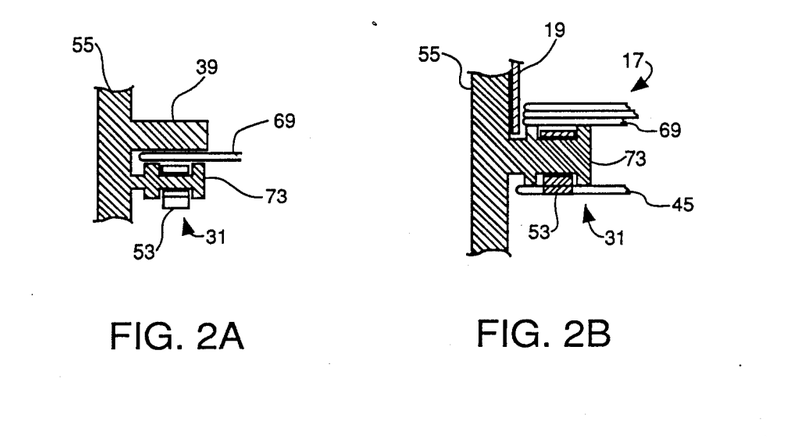
FIGS. 2A, 2B, 2C, and 2D are cut-away sectional views along line A—A, B—B, C—C, and D—D, respectively, of FIG. 2.
Figure 2C:
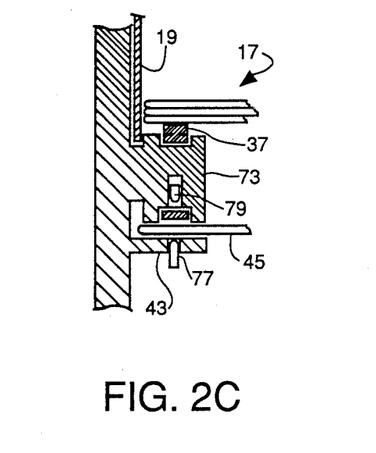

In FIGS. 2A, 2B, and 2C details of the relationships among the parts of the transport mechanism responsible for belt and diskette guiding and movement are clarified. In FIG. 2A, a cross-sectional view of the left frame 55 and associated parts taken near the upper end of one of belt guides 73, singulation gate 39 is shown to be a short, inwardly projecting vane of aluminum, for example, which may be a separate piece fastened to frame 55 or may be integrally formed therewith.

Singulation gate 39, as illustrated in FIG. 2A and suggested in FIG. 1, overlays belt 31 and guide 73 to define a narrow gap within which only a single diskette 69 can be accommodated. As visible in each of FIGS. 2A, 2B, and 2C, the upwardly and downwardly moving portions of belt 31 are each confined within a channel on the respective faces of guide 73. These channels are of a depth such that only the cogs on the outside of belt 31, such as the illustrated second cog 53, project beyond the faces of guide 73. In this way, there is no possibility that diskettes can be accidentally moved merely by frictional contact with the smooth outer surface portions of belt 31.

In FIG. 2B, a cross-section taken at the level of second cog 53, the width of guide 73 is noticeably greater and the separation of the two sections of belt 31 is correspondingly larger. Portions of input diskette 69 and of input stack 17 are visible, as is output diskette 45. Second cog 53 is shown moving into position to contact the upper edge of output diskette 45 as shown in FIG. 1.

In FIG. 2C, a cross-section taken at the level of first cog 37 and just below the lower ede of input diskette 69, the width of guide 73 is near its maximum. Guide plate 43, like singulation gate 39 in FIG. 2A, is formed as a vane of metal projecting inwardly from frame 55 close enough to guide 73 to define a narrow slot within which output diskette 45 is confined in close proximity to guide 73. Diskette 45 remains in this position until second cog 53 has moved downwardly sufficiently to engage its top edge and transport diskette 45 into output stack 29.

A light-emitting diode or LED 77 is mounted within guide plate 43 facing toward, and on-axis with, a photo-diode 79 mounted within guide 73. A pair of holes (not shown) in belt 31 are so spaced with respect to first and second cogs 37 and 53 that one of the holes is in alignment with LED 77 and photo-diode 79 whenever an input diskette 69 has been fully inserted within drive 3 (as illustrated in FIG. 2D).

Also noticeable in both FIGS. 2B and 2C is that side 19 of input tray 13 extends beyond the edges of all the diskettes in input stack 17 such that the stack comes to rest with the endmost diskette in contact with guide 73. FIG. 1 correspondingly shows that with input tray 13 fully inserted in the autoloading mechanism 1, loading stop 26 extends into the void space between guides 73, while drive pulleys 33 are accommodated within the receses 28 of input tray 13. Thus, while loading stop 26 serves as a convenient closure of the end of tray 13, preventing the diskettes from spilling while the tray is removed from autoloading mechanism 1, it does not interfere with the transport of diskettes by belt 31.

Similarly, the loading stop 26 on the end of output tray 22 extends into the void space between loading fingers 51 when output tray 22 is fully inserted in the autoloading mechanism 1, such that the endmost diskette in output tray 22 rests upon the surface of fingers 51. Consequently, output diskettes can be caught in the nip between fingers 51 and the endmost diskette of output stack 29 without interference from loading stop 26. As with drive pulleys 33 and input tray 13, loading fingers 51 are accommodated within the recesses 28 of output tray 22.

Figure 2D:
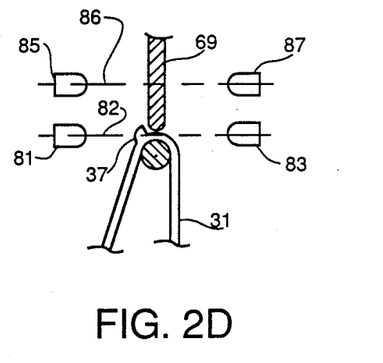

FIG. 2D is an enlarged cross-sectional view illustrating the physical positioning of the diskette 69 and belt 31 when loading of drive 3 has been accomplished. A lower LED 81 and a lower photo-diode are positioned on a lower axis 82 which is below the lower edge of diskette 69 when it is fully inserted within drive 3. An upper LED 85 and an upper photo-diode 87 are positioned on an upper axis 86 which intersects the loaded diskette. Consequently, the condition that a diskette is present in the loaded position within drive 3 can be sensed whenever there is a signal from photo-diode 83, and no signal from photo-diode 87.

This signal condition is adequate to indicate the presence of a diskette in a position for read-write operations to commence. However, ensuring that the belt 31 stops at precisely the point illustrated, with the lower edge of diskette 69 at the upper apex of the belt loop and the plane of diskette 69 intersecting the axis of loading pulley 35 requires greater sensing precision than can be derived from the signals provided by photo-diodes 83 and 87. Consequently, as indicated above, the accurate positioning of belt 31 as illustrated is achieved by positioning the above-mentioned holes in belt 31 such that one of them is on-axis with LED 77 and photo-diode 79 (FIG. 2C) when the belt has reached the position illustrated in FIG. 2D.

Accurate positioning of diskette 69 with its lower edge resting on the apex of the belt loop and its plane approximately intersecting the axis of loading pulley 35 is important if the autoloading disk drive mechanism 1 is designed for use with current 5.25 inch or 8 inch floppy diskette media. Commercially available drives for these media generally provide positive positioning of the flexible envelope of a loaded diskette along the rear edge and the two side edges, but not along the edge which is nearest the entrance to the diskette insertion slot. Such positioning provided within the drive is adequate to ensure that the rotating media is approximately centered within the flexible envelope so long as the drive is not operated in the vertical, inverted position illustrated in FIG. 1 of this application.

Figure 3A:
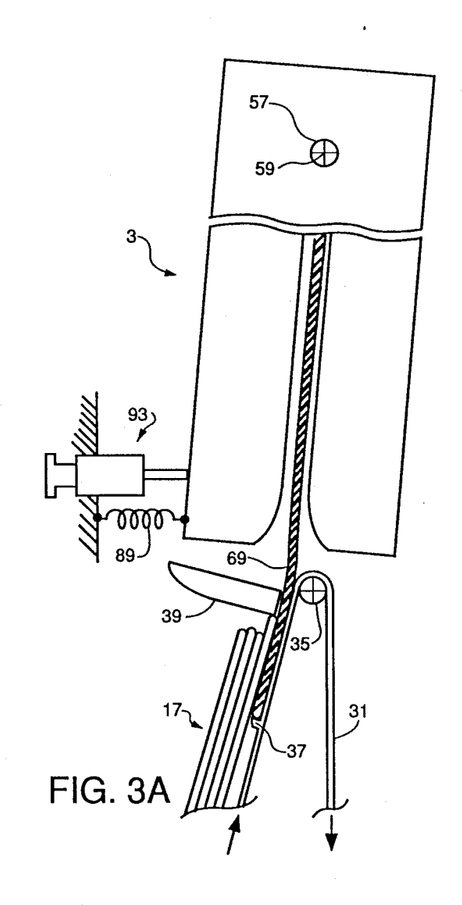
FIGS. 3A–3C are side elevational views in partly schematic form, illustrating the mounting and positioning of a disk drive within the apparatus of FIG. 1.
Figure 3B:
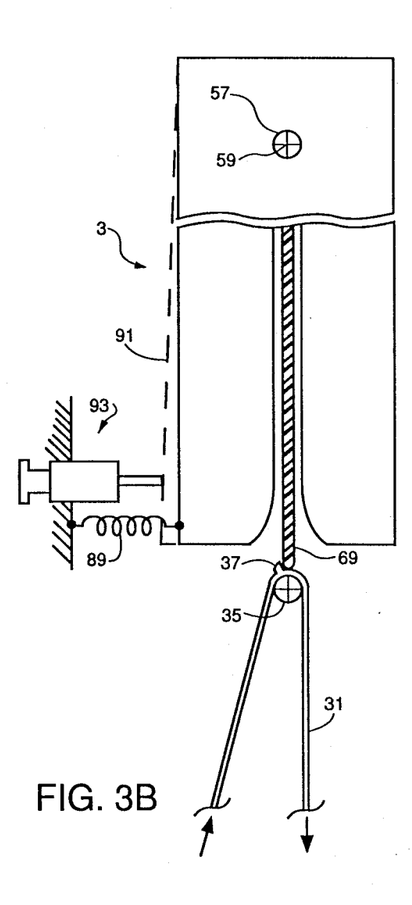

However, without a means to support the lower edge of the diskette envelope, operation of these drives in the position illustrated in FIGS. 1 and 3B would result in the flexible envelope falling until its upper edge rests upon the rotating media, causing destructive wear particles to develop within the envelope. By ensuring the belt 31 stops in the position illustrated in FIG. 2D, and by properly setting the height of loading pulley 35 with respect to the drive spindle of drive 3, the lower edge of a loaded diskette is supported in a position such that the media is centered within its envelope and the above-noted wear problem is avoided.

Consequently, for the 5.25 and 8 inch floppy media, the just-described arrangements needed to support the lower edge of the diskette envelope constitute an important portion of the means to retain a disk in position for read-write data operations within the disk drive. The other portion of the disk retaining means for such media is the hub-clamping and head-loading mechanism, which will be dealt with separately below.

An autoloading mechanism 1 designed for use with 3.5 inch diskettes does not need the above arrangements for adequate support of the diskette envelope in the vertical, slot-inverted position, and does not need any modifications to the hub clamping mechanism either. Accordingly, the disk retaining means according to the present invention are not needed, since adequate means of a corresponding sort are contained in the 3.5 inch disk drive itself.

Figure 3C:
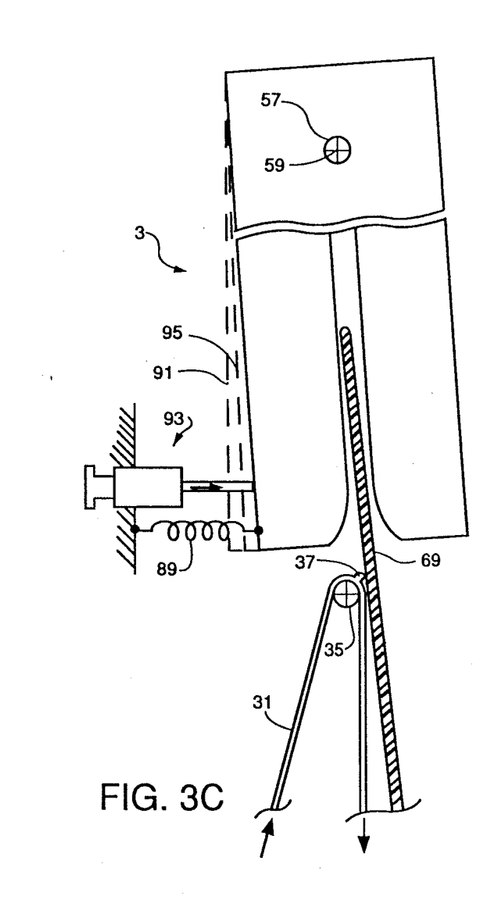

FIGS. 3A, 3B, and 3C illustrate the position of disk drive 3 during loading or insertion of diskette 69, during read-write operations, and during diskette ejection, respectively. In FIG. 3A, diskette 69 is shown nearing the point of full insertion in drive 3, which is held in its leftmost position by a spring 89. As shown in FIG. 3A, singulation gate 39 maintains the lower part of diskette 69 approximately parallel to the adjacent surface of belt 31 and also restrains the next diskette in input stack 17 from being entrained by diskette 39.

As diskette 69 is propelled upwardly into drive 3 it undergoes a slight flexing or bowing as shown because the diskette insertion slot 61 in drive 3 is not perfectly aligned with the path of motion of diskette 69 along belt 31. Such bowing is entirely harmless to flexible diskettes, but would be intolerable in the case of media enclosed in a rigid envelope, as current 3.5 inch diskettes are.

However, all such need for bowing can be avoided by repositioning pivot axis 59 such that it: (1) extends transversely across the median plane of the diskette insertion slot 61 in drive 3, and; (2) coincides with the line of intersection of a pair of diskettes held against the faces of guides 73 (FIG. 2). In achieving these ends, the belt pulley diameters and/or spacing can be altered to shift the optimum position of axis 59 up or down in accordance with criterion (2) above.

In FIG. 3B, diskette 69 is fully inserted in drive 3 and belt 31 has come to rest in the position illustrated in FIG. 2D. Noticeable in FIG. 3B is the fact that in the fully loaded position, drive 3 has repositioned itself on its pivot axis 59 such that its diskette insertion slot 61 is approximately aligned with the axis of loading pulley 35. The FIG. 3A position formerly occupied by drive 3 is indicated by a dotted line 91 in FIG. 3B. The force needed to move drive 3 to the position shown in FIG. 3B against the force of spring 89 is supplied by belt 31, and in particular by first cog 37, applying a small rightward pressure against the lower edge of diskette 69.

Figure 4:
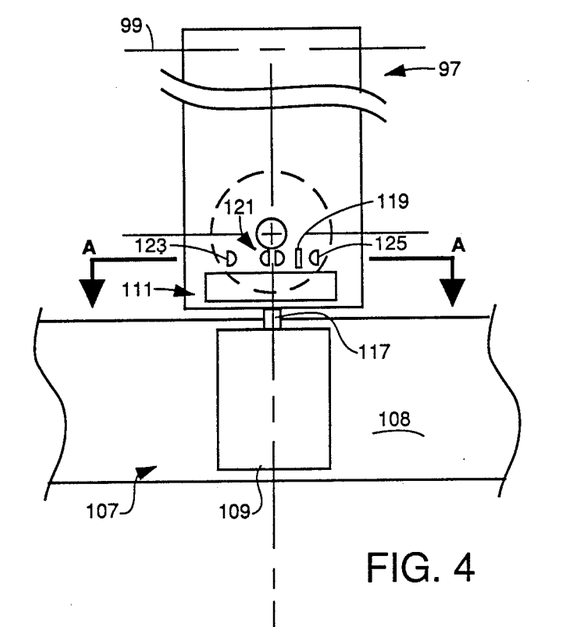
FIGS. 4 and 4A are views in partly schematic form of a modified disk-clamping mechanism according to the present invention.

With disk drive 3 in the position illustrated in FIG. 3B and with diskette 69 fully inserted within drive 3, the disk hub clamp and head-loading mechanism (not shown) of drive 3 is operated by means which will become clearer in reference to FIG. 4, and read-write operations commence. At the end of these operations, the hub clamp mechanism is released and drive 3 is repositioned to eject diskette 69 as shown in FIG. 3C.

In order to permit diskette 69 to fall from drive 3 under the influence of gravity forces, drive 3 is repositioned such that its diskette insertion slot 61 is aligned with the output side of belt 31 (the right side in FIG. 3C). The means for achieving this is a solenoid 93 which is pulse-actuated to push the lower end of drive 3 to the right, causing drive 3 to pivot on its pivot axis 59 and assume the orientation illustrated in FIG. 3C. The FIG. 3B position formerly occupied by drive 3 is illustrated by a dotted line 95 in FIG. 3C.

In order for diskette 69 to fall freely down the right or output side of belt 31, the lower edge of diskette 69 must move to the right, away from its FIG. 3B position centered over the axis of pulley 35. Although the rightward thrust imparted to drive 3 by solenoid 93 is usually adequate to dislodge the lower end of diskette 69 from engagement with belt 31, such disengagement is ensured by advancing the belt a short distance simultaneously with the movement of drive 3, such that cog 37 moves to the position shown in FIG. 3C, thus pushing the bottom edge of diskette 69 to the right. Diskette 69 then freely falls from drive 3 and drops downwardly along the right or output side of belt 31 as shown in FIG. 3C. Solenoid 93 is then released and spring 89 returns drive 3 to the loading position shown in FIG. 3A.

Figure 4A:
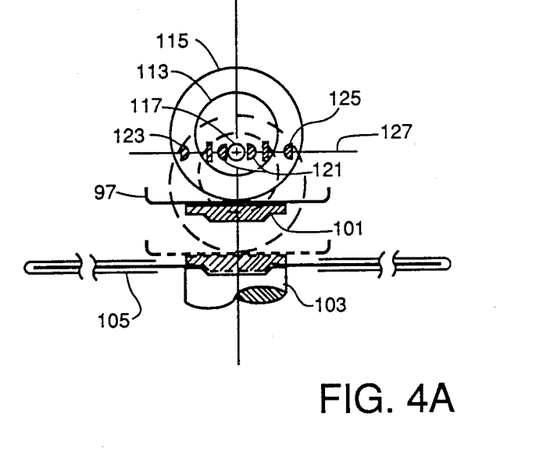

FIGS. 4 and 4A illustrate in somewhat schematic form a relatively simple modification which can be performed on a standard disk drive of the sort which uses a manually operated lever to operate the hub-clamp and head-loading mechanism, as is the case for the common 5.25 inch floppy-disk drives. Current 3.5 inch disk drives self-load whenever a diskette is inserted, and do not need the modification of FIGS. 4 and 4A.

A spring-loaded platen 97 pivots about a platen axis 99 and, in the absence of any externally applied force, occupies the unloaded position shown in solid outline in FIG. 4A. In this unloaded position a hub clamp 101, attached to platen 97, and the magnetic head (not shown) are withdrawn from a diskette 69 inserted within the drive. Consequently, the diskette can be freely inserted in or removed from the drive.

The loaded position of platen 97, shown in dotted outline in FIG. 4A, is one in which hub clamp 101 is pressed into engagement with a drive spindle 103, such that the drive motor (not shown) can drive spindle 103, hub clamp 101, and a floppy magnetic disk 105 which is clamped between spindle 103 and clamp 101. At the same time, the mangetic head (not shown) is loaded against the recording surface of magnetic disk 105 such that read-write operations can be carried out.

As thus far described, the mechanism of FIGS. 4 and 4A and the operations thereof are entirely conventional and typical of the common 5.25 inch floppy disk drives currently in use. However, in such drives the operations of loading and unloading the hub-clamp and head-loading mechanism are accomplished by a manual control which the operator actuates to move platen 97 between its loaded and unloaded positions.

In accordance with the present invention, the common sort of floppy disk drive can be readily adapted for use in an autoloading disk drive mechanism by removing the parts used to manually actuate platen 97 and substituting a motor-driven actuator 107 mounted on a frame member 108 of drive 3. Actuator 107 includes a small geared motor 109 driving an eccentric cam 111 which moves platen 97 between clamped and released positions. By being mounted on frame member 108, actuator 107 follows the motions of drive 3 discussed above, and the mechanical complexity which would be required if the actuator were mounted on support frames 55 is avoided.

Geared motor 109 may consist of a 12 volt DC motor with 100:1 reduction gearing, for example. Eccentric cam 111 includes an eccentric driver 13 mounted within the inner race of a standard ball-bearing set 115, which has been indicated schematically by a single circle in FIG. 4A. Driver 113 consists of a short cylinder of metal of a diameter appropriate to be press-fitted within the inner race of ball-bearing set 115, and having an off-center hole within which motor shaft 117 is received and retained by a setscrew (not shown). By positioning this hole off-center by 0.150 inch, for example, an eccentric motion of 0.300 inch is obtained when shaft 117 is rotated by motor 109.

In FIG. 4A, cam 111 is shown in solid outline in the position in which platen 97 is unloaded from diskette 69, and in dotted outline in the loaded position. As is readily apparent in FIG. 4A, only 180 degrees of rotation of shaft 117 is required to cause the mechanism to transit between these two positions. In order to control the movement of eccentric cam 111 between the unloaded and loaded positions, a flag 119, a pair of LEDs 121, a load sensor 123, and an unload sensor 125 are provided.

Flag 119 may be formed as a tab of metal projecting from the surface of cam 111. Sensors 123 and 125 may be photo-diodes or photo-transistors, for example. LEDs 121 and sensors 123 and 125 are positioned on a sensor axis 127 which intersects the axis of shaft 117. Along axis 127, LEDs 121 emit twin beams of light to illuminate each of sensors 123 and 125.

As best shown in FIG. 4A, elements 119-125 are positioned and oriented to cause flag 119 to intercept the beam of light to unload sensor 125 whenever cam 111 is in its unloaded position, and to intercept the beam of light to load sensor 123 whenever cam 111 is in its loaded position. Accordingly, the signals from these sensors can be used to accurately control the movement of cam 111 between these two positions.

Figure 5:
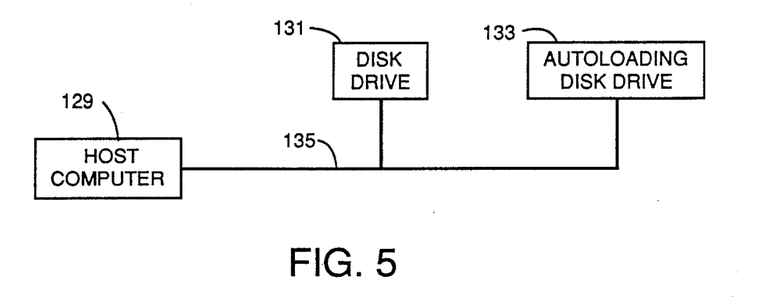
FIG. 5 is a block-schematic diagram of a computer system utilizing an autoloading disk drive according to the present invention.

FIG. 5 illustrates a simplified block diagram of a host computer and peripheral devices, one of which is an autoloading disk drive according to the present invention. A host computer 129 communicates with its peripheral devices such as a disk drive 131 and an autoloading disk drive 133 of the sort described in this patent application by means of a peripheral bus, sush as a standard RS-232 serial bus 135. Under operator or program control host computer 129 issues commands to, and receives status signals from, each of the peripheral devices on bus 135. In addition, data is transferred between host computer 129 and peripherals 131 and 133 over bus 135.

Figure 6:
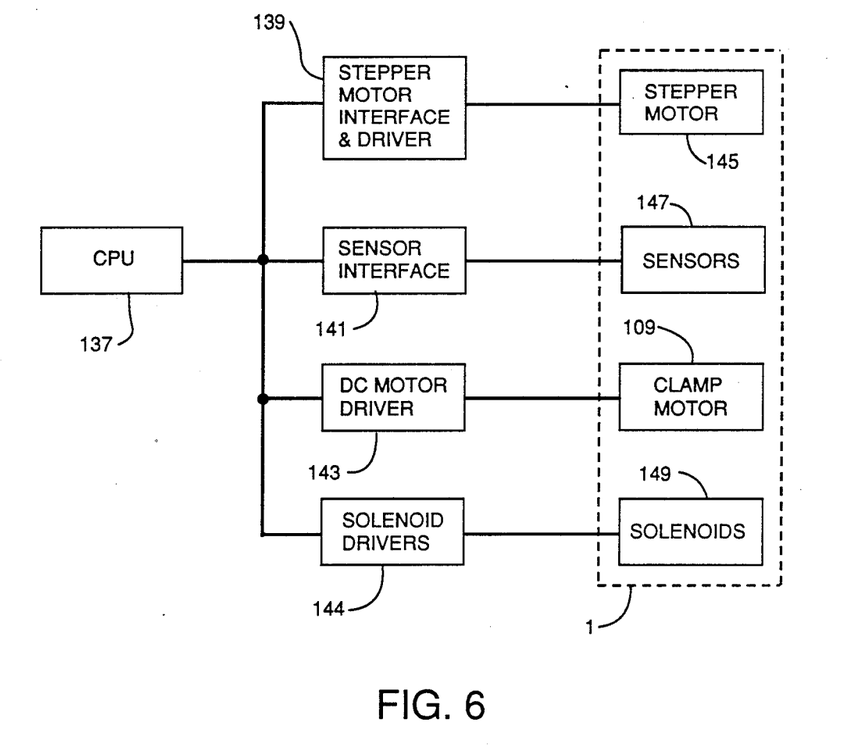
FIG. 6 is a block-schematic diagram of an electronic control system used in an autoloading disk drive according to the present invention.

In FIG. 6, a simplified block diagram of an electronic control system for responding to commands from host computer 129 and providing status signals relative to the operation of an autoloading disk drive according to the present invention is illustrated. FIG. 6 is, accordingly, a diagram of the electronic circuitry within the autoloading disk drive 133 of FIG. 5.

A central processing unit (CPU) 137 includes a microprocessor with resident RAM and ROM memories. Central processing unit 137 stores an instruction set and interfaces both with host computer 129 and with the circuit blocks responsible for controlling the functional parts of the autoloading disk drive. These circuit blocks include a stepper-motor interface and driver 139, a sensor interface 141, a DC motor driver 143, and a solenoid driver 144.

Interface and driver 139 is connected to a stepper motor 145, and includes the specialized circuitry needed to drive stepper motor 145 in response to move commands from CPU 137. Stepper motor 145 drives motor pulley 67 of FIG. 2 by means of a cogged belt (not shown). Sensor interface 141 is connected to the various sensors (collectively labelled 147) of the autoloading disk drive and provides status signals concerning the operation of the drive to CPU 137. DC motor driver 143 responds to commands from CPU 137 and provides a source for driving the clamp motor 109. Solenoid driver 144 includes drivers for each of the solenoids 149, thus controlling drive positioning and also the positioning of selector interposer 41. Circuit blocks 145-149, and 109 are enclosed within a dotted line labelled 1 in FIG. 6 to indicate that they are located within the autoloading disk drive mechanism 1 of FIGS. 1 and 2 discussed above.

Although this invention has been described with some particularity with respect to embodiments which, taken together, comprise the best mode known to the inventor for carrying out his invention, many changes could be made, and many different embodiments could thus be derived without departing from the scope of the invention. Consequently, the scope of the invention is to be determined only from the following claims.

I claim:

1. An autoloading disk drive apparatus for accepting an input plurality of interchangeable-media disks in the form of an input stack of such disks, for sequentially removing each of said disks from said stack, for carrying out read-write data operations thereon, and for placing selected ones of said disks in an output stack, comprising:

a support frame;

a disk drive mounted on said support frame for sequentially receiving each one of said input disks within a disk insertion slot therewithin, and for carrying out data operations on a disk so received;

an input tray means mounted on said support frame for containing said input stack of disks and for advancing said stack as each disk is removed therefrom;

disk transport means mounted on said support frame for removing an input disk from one end of said input stack, for advancing said input disk along an input axis to said disk drive, and for inserting said input disk in said drive;

drive positioning means mounted on said support frame for positioning said drive in an input position in which said disk insertion slot is generally aligned with said input axis to receive said input disk, and for moving said drive away from said input position to an output position in which said disk insertion slot is generally aligned with an output axis displaced from said input axis for ejection of said input disk from said drive to an output stack or a reject stack;

control means, coupled to said disk transport means and said drive positioning means, for initiating and controlling a sequence of operations in which an input disk is removed from said input stack, is transported to and inserted within said disk drive, data operations are carreid out on said input disk, said drive positioning means is operated to cause said drive to transit to said output position to eject said input disk and to return to said input position to receive a subsequent disk.

2. The apparatus of claim 1 wherein said output axis is generally vertical, and wherein said drive positioning means moves said drive into an output position in which said disk insertion slot is generally vertical and facing downwardly to cause said input disk to eject from said drive by gravitational force.

3. The apparatus of claim 1 wherein said disk transport means comprises a flexible, endless belt and drive motor means operable to move said belt.

4. The apparatus of claim 3 wherein said disk transport means further comprises a driving pulley adjacent said input tray means and a loading pulley adjacent said disk drive, wherein said belt extends in a loop between said driving pulley and said loading pulley, and wherein said motor means is coupled to said driving pulley.

5. The apparatus of claim 4 wherein said belt on one side of said loop extends proximate to and generally parallel to said input disks in said input stack and from said input stack to said disk drive along said input axis.

6. The apparatus of claim 3 wherein said disk transport means further comprises a first cog means on the outside surface of said belt for engaging the edge of a single disk and moving said single disk whenever said belt moves.

7. The apparatus of claim 6 further including:

output tray means mounted on said support frame for containing said output stack of disks, said output tray means having one end thereof positioned to intercept a disk travelling along said output axis and having output follower means to urge said output stack toward said one end;

said first cog means engaging the edge of an output disk so intercepted and inserting said output disk in said output stack as said belt moves.

8. The apparatus of claim 5 wherein said belt on the other side of said loop extends generally parallel to said output axis, and further including disk output guide means positioned generally parallel to said output axis and spaced from said belt on said other side of said loop to define therebetween an output path for accepted disks.

9. The apparatus of claim 1 further including a reject interposer means selectively operable to extend across said output axis to deflect a disk travelling therealong into a reject stack.

10. The apparatus of claim 1 further including disk retaining means coacting with said disk drive for retaining an input disk within said insertion slot in position for said data operations, said disk retaining means being operable to so retain a disk during said data operations and to release a disk from said drive at the end of said operations.

11. The apparatus of claim 10 wherein said disk retaining means includes disk clamping means comprising:

a platen on said disk drive, said platen being movable toward said disk insertion slot to thereby clamp a disk therewithin, and movable away from said disk insertion slot to thereby release a disk therewithin;

electromechanical means on said disk drive for selectively moving said platen between a clamped position toward said disk insertion slot and a released position away from said disk insertion slot;

said control means being electrically coupled to said electromechanical means to remotely control the clamping and releasing of a disk within said disk insertion slot.

12. The apparatus of claim 11 wherein said disk clamping means further comprises sensor means for responding to the movement of said clamping means by generating a disk-clamped signal when said platen has reached said clamped position and a disk-released signal when said platen has reached said released position.

13. The apparatus of claim 11 wherein said electromechanical means comprises:

an electric motor mounted on said disk drive; and an eccentric cam coupled to said motor and rotated thereby, said eccentric cam also being coupled to said platen to move said platen between said clamped and released positions as said motor and cam rotate.

14. The apparatus of claim 13 wherein said eccentric cam comprises:

a ball-bearing set having an outer race in contact with said platen; and, an eccentric driver means coupled between said electric motor and said ball-bearing set for converting the rotary motion of said electric motor to an eccentric motion of said ball-bearing set.

15. The apparatus of claim 1 wherein said disk drive is supported within said support frame by at least one pivot support, said pivot support defining a pivot axis extending in a direction transverse to said input and output axes, and wherein said drive positioning means pivotally moves said drive between said input and output positions.

16. The apparatus of claim 15 wherein said pivot support comprises a pair of trunnions so mounted on said drive to cause said pivot axis to extend transversely across and generally parallel to said disk insertion slot.

17. The apparatus of claim 10 wherein said interchangeable-media disks comprise an outer envelope and, within said outer envelope, a disk of recording media, wherein said disk drive is oriented with said disk insertion slot facing generally downwardly, wherein said drive positioning means is operable to position said drive in a read-write position displaced from said input and output positions, and wherein said disk retaining means comprises:
- outer envelope support means for supporting the lower edge of said outer envelope of a disk within said disk insertion slot when said drive is in said read-write position.

18. The apparatus of claim 1 wherein said input tray means comprises:
- a floor for supporting the lower edges of said input stack of disks;
- edge guiding means positioned above said floor for maintaining edge alignment of said input stack; and,
- follower means positioned in said tray means at the end of said stack opposite said one end thereof, for urging said input stack toward said one end; and,
- wherein said tray means is so mounted on said support frame as to cause said floor to slope downwardly toward said one end at substantially the friction angle of said lower edges on said floor.

19. The apparatus of claim 18 wherein said follower means comprises:
- a follower extending in a direction upwardly from said floor to contact said opposite end of said stack; and,
- a pair of rollers in contact with said floor and supporting said follower thereupon.

20. The apparatus of claim 18 further including:
- tray attachment means mounted on said support frame for positioning said input tray means thereupon, said tray attachment means permitting rapid removal of said input tray means therefrom.

21. The apparatus of claim 20 wherein said tray attachment means comprises a pair of spaced apart support rails on said frame for supporting said tray floor thereupon.

22. An autoloading disk drive apparatus for accepting an input plurality of interchangeable-media disks in the form of an input stack of such disks, for sequentially removing each of said disks from said stack, for carrying out read-write data operations thereon, and for placing selected ones of said disks in an output stack, comprising:
- a support frame;
- a disk drive mounted on said support frame for sequentially receiving each one of said input disks within a disk insertion slot therewithin, and for carrying out data operations on a disk so received;
- an input tray means mounted on said support frame for containing said input stack of disks and for advancing said stack as each disk is removed therefrom;
- disk transport means mounted on said support frame for removing an input disk from one end of said input stack, for advancing said input disk along an input axis to said disk drive, and for inserting said input disk in said drive, said disk transport means comprising a flexible, endless belt extending between said input tray means and said disk drive, drive motor means operable to move said belt in a direction from said tray means to said disk drive, and input disk engagement means on said belt to engage and transport an input disk from said input tray to said disk drive and to insert said input disk into said insertion slot;
- drive positioning means mounted on said support frame for positioning said drive in an input position in which said disk insertion slot is generally aligned with said input axis to receive said input disk, and for moving said drive away from said input position to an output position in which said disk insertion slot generally faces downwardly in alignment with a generally vertical output axis displaced from said input axis for ejection of said input disk from said drive by gravitational force to an output stack or reject stack;
- control means, coupled to said disk transport means and said drive positioning means, for initiating and controlling a sequence of operations in which an input disk is removed from said input stack, is transported to and inserted within said disk drive for data operations thereon, said drive positoning means is operated to cause said drive to transit to said output position to eject said input disk and to return to said input position to receive a subsequent disk.

23. The apparatus of claim 22 wherein said disk engagement means comprises a first cog means on the outside surface of said belt for engaging the edge of a single disk and moving said single disk whenever said belt moves.

24. The apparatus of claim 22 further including disk retaining means coacting with said disk drive for retaining an input disk within said insertion slot in position for said data operations, said disk retaining means being operable to so retain a disk during said data operations and to release a disk from said drive at the end of said operations;

25. The apparatus of claim 24 wherein said interchangeable-media disks comprise an outer envelope and, within said outer envelope, a disk of recording media, wherein said disk drive is oriented with said disk insertion slot facing generally downwardly, wherein said drive positioning means is operable to position said drive in a read-write position displaced from said input and output positions, and wherein said disk retaining means comprises:
- outer envelope support means for supporting the lower edge of said outer envelope of a disk within said disk insertion slot when said drive is in said read-write position.

* * * * *